(12) United States Patent
Christensen et al.

(10) Patent No.: US 7,710,859 B2
(45) Date of Patent: May 4, 2010

(54) FAULT-TOLERANT BROADCAST ROUTER

(75) Inventors: Carl L. Christensen, South Jordan, UT (US); Marc Stuart Walker, Taylorsville, UT (US); David Kim Blair, Taylorsville, UT (US); David Lynn Blytheway, Murray, UT (US); Lynn Howard Arbuckle, Bountiful, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 757 days.

(21) Appl. No.: 10/518,670

(22) PCT Filed: Jun. 13, 2003

(86) PCT No.: PCT/US03/19016

§ 371 (c)(1),
(2), (4) Date: Dec. 17, 2004

(87) PCT Pub. No.: WO04/002050

PCT Pub. Date: Dec. 31, 2003

(65) Prior Publication Data

US 2005/0243710 A1    Nov. 3, 2005

Related U.S. Application Data

(60) Provisional application No. 60/390,843, filed on Jun. 21, 2002.

(51) Int. Cl.
*H04L 12/26* (2006.01)
(52) U.S. Cl. ..................... 370/216; 370/244
(58) Field of Classification Search ......... 370/216–220, 370/242–244, 250
See application file for complete search history.

(56) References Cited

U.S. PATENT DOCUMENTS

| 4,213,201 A | * | 7/1980 | Gagnier et al. | ............... 370/220 |
| 5,268,909 A | | 12/1993 | Loebig | |
| 5,740,157 A | * | 4/1998 | Demiray et al. | ............. 370/219 |

(Continued)

FOREIGN PATENT DOCUMENTS

JP          09-284300          10/1997

(Continued)

OTHER PUBLICATIONS

Search Report Dated Sep. 11, 2003.

*Primary Examiner*—Kwang B Yao
*Assistant Examiner*—Andrew Lai
(74) *Attorney, Agent, or Firm*—Robert D. Shedd; Robert B. Levy (57) ABSTRACT

A fault-tolerant router includes first and second router matrix card. The first and second router matrix cards receive a common set of 4n parity encoded input digital audio data streams and respectively generates therefrom, first and second sets of M output digital audio streams. As the first and second sets of data streams propagate along the first and second router matrix cards, respectively, one or more health bits are set whenever an error or other type of fault condition is detected. First and second parity check circuits are configured to detect parity errors and/or assess the relative health of the first and second sets of data streams and one of the two sets of data streams is selected as the output of the fault-tolerant router based upon either the parity error analysis, health analysis or both.

13 Claims, 2 Drawing Sheets

U.S. PATENT DOCUMENTS

| | | | |
|---|---|---|---|
| 6,088,329 A * | 7/2000 | Lindberg et al. | 370/217 |
| 6,246,681 B1 * | 6/2001 | Humphrey et al. | 370/389 |
| 6,272,113 B1 | 8/2001 | McIntyre et al. | |
| 6,320,860 B1 * | 11/2001 | Hurlocker | 370/395.51 |
| 6,330,221 B1 * | 12/2001 | Gomez | 370/217 |
| 6,381,218 B1 | 4/2002 | McIntyre et al. | |
| 6,570,845 B1 | 5/2003 | Blanc et al. | |
| 6,667,954 B1 * | 12/2003 | Boduch et al. | 370/218 |
| 6,879,559 B1 * | 4/2005 | Blackmon et al. | 370/225 |

FOREIGN PATENT DOCUMENTS

| | | |
|---|---|---|
| JP | 2000-013408 | 1/2000 |
| JP | 2002-508141 | 3/2002 |
| WO | WO 01/59978 | 8/2001 |

* cited by examiner

FIG. 2

FAULT-TOLERANT BROADCAST ROUTER

CROSS REFERENCE

This application claims the benefit, under 35 U.S.C. § 365 of International Application PCT/US03/19016, filed Jun. 13, 2003, which was published in accordance with PCT Article 21(2) on Dec. 31, 2003 in English and which claims the benefit of U.S. provisional patent application No. 60/390,843, filed Jun. 21, 2002.

This application expressly incorporates by reference herein, as if reproduced in its entirety, co-pending U.S. patent application Ser. No. 10/518,226, filed on even date herewith and assigned to the Assignee of the present application.

FIELD OF THE INVENTION

The present invention relates to broadcast routers and, more particularly, to a fault-tolerant broadcast router configured to detect an error in a first output data stream and automatically switch to a second output data stream in response to the detection of the error in the first output data stream.

BACKGROUND OF THE INVENTION

A broadcast router allows each one of a plurality of outputs therefrom to be assigned the signal from any one of a plurality of inputs thereto. For example, an N×M broadcast router has N inputs and M outputs coupled together by a router matrix which allows any one of the N inputs to be applied to each one of the M outputs. While failure of any one or more of the various components, e.g., input cards, output cards, router matrix, interconnecting cables or power supply, of a broadcast router may cause a defect in the output of the router, failure of the router matrix can be particularly catastrophic since all signals for the broadcast router typically flow through the router matrix.

Accordingly, fault tolerance has long been a desired feature for broadcast routers. By configuring a broadcast router to include both a first, or primary, router matrix in combination with a second, or redundant, router matrix, broadcast routers have achieved a limited degree of fault tolerance. However, broadcast routers which incorporate a redundant router matrix have typically relied upon the use of an alarm or other type of alert to notify an operator of the broadcast router that the primary router matrix has failed and a manual switch or other type of operator-actuated device to switch the output of the broadcast router from that of the failed primary router matrix to that of the redundant router matrix.

SUMMARY OF THE INVENTION

A fault-tolerant router includes first and second router matrices and circuitry for selectively switching the output of the fault-tolerant router from a first set of digital output audio data streams generated by the first router matrix and a second set of digital output audio data streams generated by the second router matrix. Switching between the first and second set of digital output audio data streams may be initiated in response to detection of parity error in one of the digital output audio data streams, a comparison of health or status information for the respective digital output audio data streams or both.

DETAILED DESCRIPTION

Figure 1:
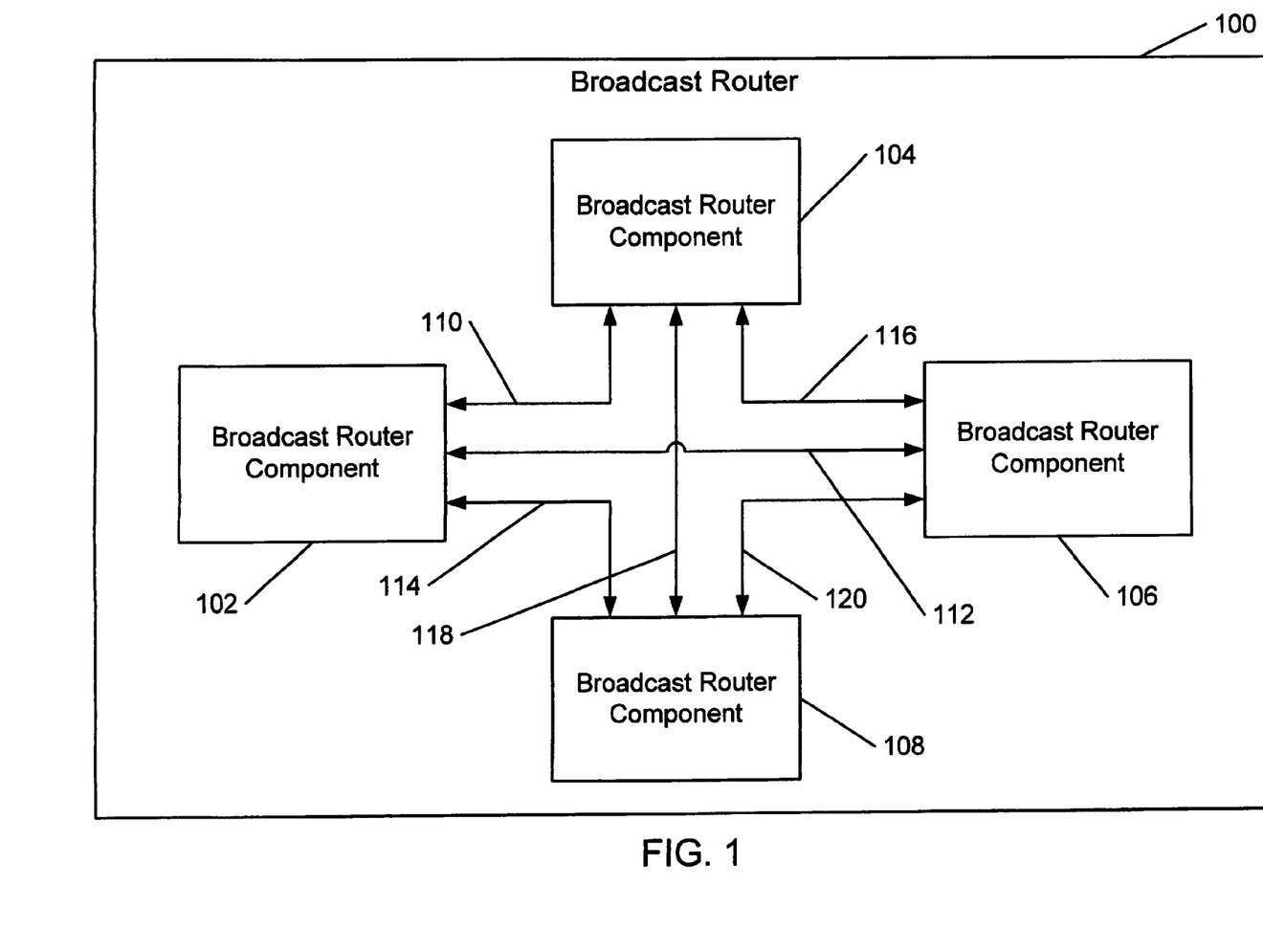
FIG. 1 is a block diagram of a broadcast router constructed in accordance with the teachings of the present invention.

Referring first to FIG. 1, a fault tolerant broadcast router 100 constructed in accordance with the teachings of the present invention will now be described in greater detail. While it is preferred that the fault tolerant broadcast router 100 be a fully redundant linearly expandable broadcast router, it is fully contemplated that the teachings of the present invention are applicable to other types of broadcast routers as well. As may be seen in FIG. 1, the fault tolerant broadcast router 100 is comprised of plural broadcast router components coupled to one another to form the larger fault tolerant broadcast router 100. As disclosed herein, each one of the broadcast router components used to construct the fault tolerant broadcast router 100 is an N×M sized broadcast router.

The fault tolerant broadcast router 100 is formed by coupling together first, second, third and fourth broadcast router components 102, 104, 106 and 108. Of course, the present disclosure of the fault tolerant broadcast router 100 as being formed of four broadcast router components is purely by way of example. Accordingly, it should be clearly understood that a fault tolerant broadcast router constructed in accordance with the teachings of the present invention may be formed using various other numbers of broadcast router components. The first, second, third and fourth broadcast router components 102, 104, 106 and 108 which, when fully connected in the manner disclosed herein, collectively form the fault tolerant broadcast router 100, may either be housed together in a common chassis as illustrated in FIG. 1 or, if desired, housed in separate chassis. While, as disclosed herein, each one of the broadcast router components 102, 104, 106 and 108 have the same N×M size, it is fully contemplated that the broadcast router components 102, 104, 106 and 108 may have different sizes relative to one another. Furthermore, while it is also contemplated that the broadcast router components 102, 104, 106 and 108 may be constructed in various sizes, one size that has proven suitable for the uses contemplated herein is 256×256.

As may be further seen in FIG. 1, the first broadcast router component 102, the second broadcast router component 104, the third broadcast router component 106 and the fourth broadcast router component 108 are coupled together in an arrangement which conforms to a fully connected topology. In a fully connected topology, each broadcast router of an arrangement of broadcast routers is coupled, by a discrete link, to each and every other broadcast router forming part of the arrangement of broadcast routers. Thus, for the arrangement of router components 102, 104, 106 and 108 which collectively comprise the broadcast router 100, first, second and third bi-directional links 110, 112 and 114 couple the first broadcast router component 102 to the second broadcast router component 104, the third broadcast router component 106 and the fourth broadcast router component 108, respectively. Additionally, fourth and fifth bi-directional links 116 and 118 couple the second broadcast router component 104 to the third broadcast router component 106 and the fourth broadcast router component 108, respectively. Finally, a sixth bi-directional link 120 couples the third broadcast router component 106 to the fourth broadcast router component 108. Variously, the bi-directional links 110 through 120 may be formed of copper wire, optical fiber or another transmission medium deemed suitable for the exchange of digital signals. Of course, rather than the single bi-directional links illustrated herein, alternatively, the broadcast router components may instead be coupled to one another by pairs of uni-directional links.

As will be more fully described below, each broadcast router component is a discrete router device which includes first and second router matrices, the second router matrix being redundant of the first router matrix such that one of the first and second router matrices may replace the other one of the first and second router matrices in the event of a failure thereof. The first router matrices are arranged in a first fully connected topology. Similarly, the second router matrices being arranged in a second fully connected topology. For each one of the broadcast router components 102, 104, 106 and 108, the same 4N input digital audio data streams are received at an input side of both the first and second router matrices and M output digital audio data streams are generated at an output side of both the first and second router matrices. Of course, it should be readily appreciated that other types of data streams other than the input of digital audio data streams disclosed herein are equally suitable for use with the broadcast router component, 102, 104, 106 and 108. For example, it is contemplated that the broadcast router components 102, 104, 106 and 108 may instead be used with other low bandwidth digital signals such as compressed video and data signals. It is further contemplated that, with minor modifications, for example, faster hardware, the broadcast router components may be used with non-compressed digital video signals.

Figure 2:
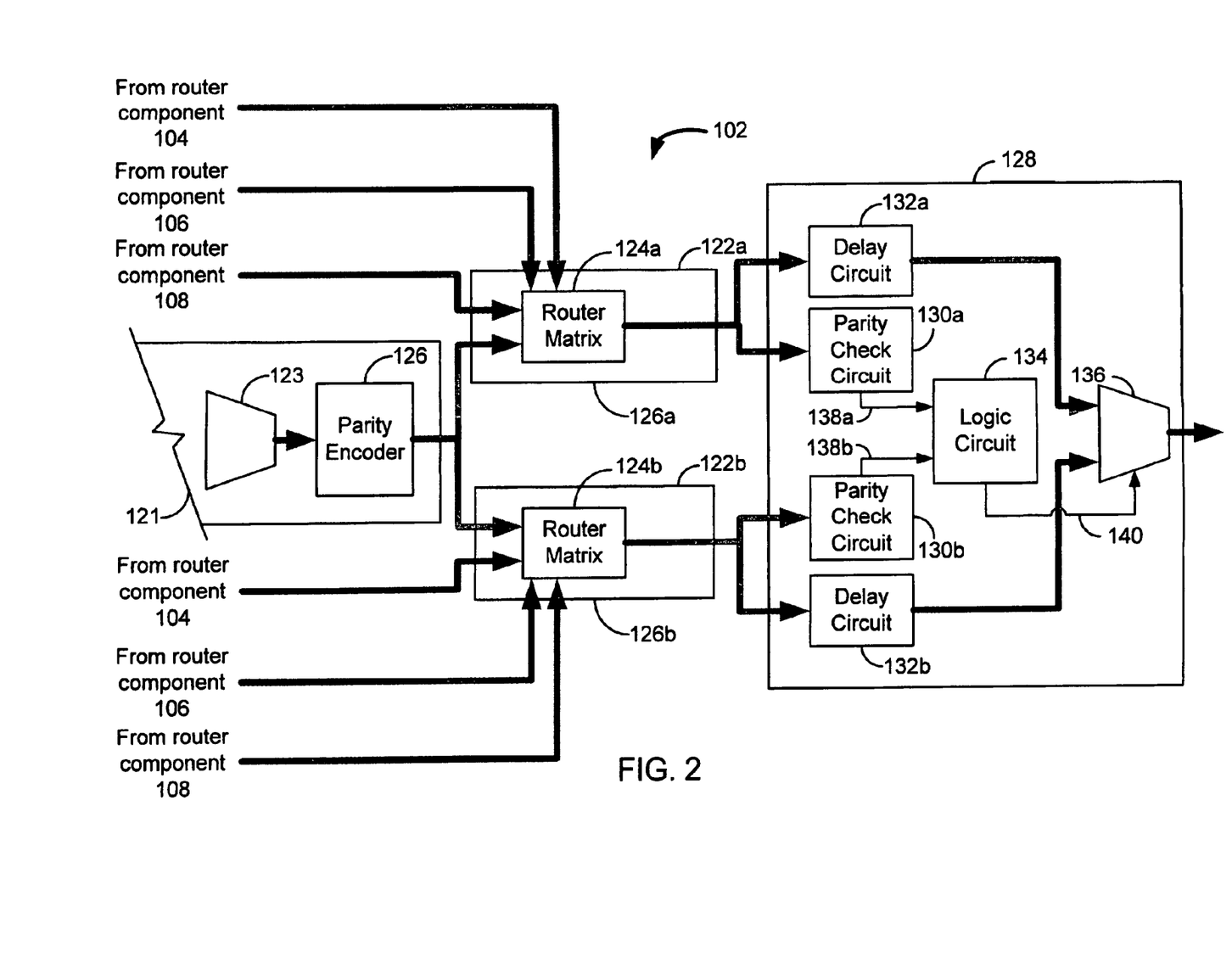
FIG. 2 is an expanded block diagram of a first broadcast router component (and associated input and output cards) of the broadcast router of FIG. 1.

The broadcast router components 102, 104, 106 and 108 will now be described in greater detail. FIG. 2 shows the first broadcast router component 102. The second, third and fourth broadcast router components 104, 106 and 108, on the other hand, are identically configured to the first broadcast router 102. Accordingly, the second, third and fourth broadcast router components 104, 106 and 108 need not be described in greater detail. As may now be seen, the first broadcast router component 102 includes a first router matrix card 122a and a second router matrix card 122b identically configured to the first router matrix card 122a. The first and second router matrix cards 122a and 122b are each slideably received within and supportably mounted by a chassis (not shown) of the broadcast router 100. Of course, while it is not necessary to use plural router matrix cards when practicing certain aspects of the invention disclosed herein, the use of plural router matrix cards is generally preferred since it facilitates the repair and/or replacement of a failed router matrix card without disturbing a properly functioning router matrix card.

Also slideably received within and supportably mounted by the chassis are an input card 121 and an output card 128. The input card 121 is coupled to each one of the first and second router matrix cards 122a and 122b. Likewise, the output card 128 is coupled to each one of the first and second router matrix cards 122a and 122b. Of course, while discrete input and output cards 121 and 128 are shown in FIG. 2, it should be clearly understood that, if desired, the functionality residing on both the input card 121 and the output card 128 may instead be placed on a single, input/output (or "I/O") card. Furthermore, while FIG. 2 shows discrete input and output cards 121 and 128, it is fully contemplated that, depending on available space thereon, all or part of the functionality shown as residing on either the input card 121, the output card 128, or both, may instead reside on the first router matrix card 122a, the second router matrix card 122b or some combination thereof.

Residing on the input card 121 is input signal selection circuitry 123 and a parity encoder 126. The input signal selection circuitry 123 selects, from plural input signals (not shown) thereto, N input signals to be passed to the parity encoder 126. Of course, it should be clearly understood that the input signal selection circuitry 123 has been greatly simplified for ease of description and that various components thereof have been omitted from the drawings. It should be further understood that the input signal selection circuitry 123 has been shown as residing on a single input card, specifically, the input card 121, purely for ease of illustration and it is fully contemplated that the input signal selection circuitry 123 may instead be distributed amongst plural input cards (also not shown). It should be noted, however, that such a configuration would likely further include plural parity encoders, one for each of the plural input cards included therein. Finally, while, in the embodiment disclosed herein, the parity encoder 126 is shown as residing on the input card 121, it is fully contemplated that the parity encoder may be placed at a wide variety of locations on the path along which the audio data is propagated. For example, if desired, a parity encoder may be placed on each one of the first and second router cards 122a and 122b and coupled to receive the M digital outputs from the first and second router matrices 124a and 124b, respectively.

From the input selection circuitry 123, the N input digital audio data streams are propagated to the parity encoder circuits 126. The parity encoder circuit processes the data received thereby to include parity information. It is contemplated that a wide variety of algorithms may be used to encode the received input digital audio data streams with parity information. For example, the first and second parity encoder circuits 126a and 126b may be configured to add a byte of parity information to each data frame and a frame of parity information for each 32 input data streams in the manner described and illustrated in co-pending U.S. patent application Ser. No. 10/515,226 and previously incorporated by reference. It should be noted, however, that when using the aforementioned technique, the number of parity encoded data streams output the parity encoder circuit 126 will vary based upon the number of input data streams. For example, using the aforementioned technique, the parity encoder 126 will produce 264 parity encoded data streams from 256 input data streams. Of course, the techniques disclosed in the above-referenced patent application is but one of a wide variety of suitable techniques for encoding data with parity information. Other techniques, for example, cyclic redundancy check (or "CRC") or checksum, are suitable for the purposes contemplated herein.

From the parity encoder 126, parity encoded digital audio data streams 1 through N are propagated to both a first router matrix 124a which resides on the first router matrix card 122a and to a second router matrix 124b which resides on the second router matrix card 122b. Additionally, the first and second router matrices 124a and 124b receive input digital audio data streams N+1 through 2N from the second broadcast router component 104, input digital audio data streams 2N+1 through 3N from the third broadcast router component 106 and input digital audio data streams 3N+1 through 4N from the fourth broadcast router component 108. Of course, input digital audio streams N+1 through 4N are all parity encoded, preferably prior to transmission to the first router matrix 124a of the first router matrix card 122a and to the second router matrix 124b of the second router matrix card 124b. While it is fully contemplated that a variety of broadcast router configurations which include plural router matrices having identical inputs to each router matrix would be suitable for the purposes contemplated herein, one such broadcast router is disclosed in co-pending U.S. patent application Ser. No. 10/518,226 and previously incorporated by reference. In that application, a broadcast router having four broadcast router components, each including a pair of router matrices coupled to receive input digital audio data streams 1 through 4N is described in great detail.

Also residing on each one of the first and second router matrix cards 122a and 122b are plural expansion ports (not shown), the configuration of which are also described in greater detail in the aforementioned patent application. Broadly speaking, the expansion ports residing on the first router matrix card 122a are used to buffer the transfer of input digital audio data streams between the first router matrix card 122a and the first router matrix cards of the second, third and fourth broadcast router components 104, 106 and 108. Similarly, the expansion ports residing on the second router matrix card 122b are used to buffer the transfer of input digital audio data streams between the second router matrix card 122b and the second router matrix cards of the second, third and fourth broadcast router components 104, 106 and 108. Of course similar expansion port configurations are provided for the same purpose on each router matrix card of the second, third and fourth broadcast router component 104, 106 and 108.

It is contemplated that a variety of expansion port configurations are suitable for these purposes and, in this regard, it should be noted that the aforementioned patent application discloses a pair of alternate embodiments thereof. In a first embodiment described therein, each of the first and second router matrix cards 122a and 122b would have first, second and third bi-directional expansion ports residing thereon. Each of the first, second and third expansion ports residing on either the router matrix card 122a or 122b would receive the same input digital audio data streams 1 through N as the router matrix 124a or 124b residing on that card. From each of the first, second and third expansion ports of the first router matrix card 122a, the input digital audio streams 1 through N are propagated to the first router matrix card of the second, third and fourth broadcast router components 104, 106 and 108. Similarly, from each of the first, second and third expansion ports of the second router matrix card 122b, the input digital audio data streams 1 through N are propagated to the second router matrix card of the second, third and fourth broadcast router components 104, 106 and 108. Additionally, the first, second and third expansion ports of the first router matrix card 122a would also receive the input digital audio data streams N+1 through 2N, 2N+1 through 3N and 3N+1 through 4N from the first router matrix card of the second, third and fourth broadcast router components 104, 106 and 108, respectively, for subsequent propagation to the router matrix 124a. Similarly, the first, second and third expansion ports of the second router matrix card 122b would also receive the input digital audio data streams N+1 through 2N, 2N+1 through 3N and 3N+1 through 4N from the second router matrix card of the second, third and fourth broadcast router components 104, 106 and 108, respectively, for subsequent propagation to the router matrix 124b.

In a second embodiment also described in the aforementioned patent application, each of the first and second router matrix cards 122a and 122b would plural unidirectional expansion ports, more specifically, a transmit expansion port and first, second and third receive expansion ports, residing thereon. The transmit expansion port residing on the first router matrix card 122a would receive the same input digital audio data streams 1 through N as the router matrix 124a. From the transmit expansion port residing on the first router matrix card 122a, the input digital audio data streams 1 through N are propagated to the first router matrix card for the second, third and fourth broadcast router components 104, 106 and 108. Similarly, the transmit expansion port residing on the second router matrix card 122b would receive the same input digital audio data streams 1 through N as the router matrix 124b. From the transmit expansion port residing on the second router matrix card 122a, the input digital audio data streams 1 through N are propagated to the second router matrix card for the second, third and fourth broadcast router components 104, 106 and 108. Conversely, the first, second and third receive expansion ports of the first router matrix card 122a would receive the input digital audio data streams N+1 through 2N, 2N+1 through 3N and 3N+1 through 4N from the first router matrix card of the second, third and fourth broadcast router components 104, 106 and 108, respectively, for subsequent propagation to the router matrix 124a. Similarly, the first, second and third receive expansion ports of the second router matrix card 122b would receive the input digital audio data streams N+1 through 2N, 2N+1 through 3N and 3N+1 through 4N from the second router matrix card of the second, third and fourth broadcast router components 104, 106 and 108, respectively, for subsequent propagation to the router matrix 124b.

Functionality within each one of the first and second router matrices 124a and 124b allows each one of the M outputs therefrom to be connected to a selected one of the 4N inputs thereto. Selection of the particular one of the 4N inputs to which each one of the M outputs is connected is controlled by control circuitry (not shown). The router matrices 124a, 124b are identically controlled so that the M output digital audio data streams for the router matrix 124a are the same as the M output digital audio data streams for the router matrix 124b.

Residing on the output card 128 are a first parity check circuit 130a, a second parity check circuit 130b, a first delay circuit 132a, a second delay circuit 132b, a logic circuit 134 and a switching circuit 136. From the first parity encoder circuit 126a, the parity encoded digital audio data streams, are propagated to both the parity check circuit 130a and the delay circuit 132a. The first delay circuit 132a delays propagation of the received parity encoded digital audio data streams while the first parity check circuit 130a checks the received parity encoded digital audio data streams for the presence of a transmission error. While the first delay circuit 132 may be variously configured, it is contemplated that a first-in-first-out (or "FIFO") memory device having a width corresponding to the number or received parity encoded digital audio data streams and a depth selected based upon the time required for the parity check circuit 130a to perform the desired parity checks, for example, the parity checks described in the aforementioned U.S. patent application Ser. No. 10/518,226, on the received parity encoded digital audio data streams. Similarly, from the parity encoder circuit 126b, the replicated parity encoded digital audio data streams are propagated to both the parity check circuit 130b and the delay circuit 132b. Here, the second delay circuit 132b delays propagation of the replicated received parity encoded digital audio data streams while the second parity check circuit 130b checks the received replicated parity encoded digital audio data streams for the presence of a transmission error.

As may also be seen in FIG. 2, the first parity check circuit 130a further includes an output line 138a tied to the logic circuit 134. The output line 138a is normally unasserted. If, however, the first parity check circuit 130a detects a transmission error in the received parity encoded digital audio data stream, the first parity check circuit 130a will assert the output line 138a. Similarly, the second parity check circuit 130b further includes an output line 138b tied to the logic circuit 134. Like the output line 138a, the output line 138b is normally unasserted. If, however, the second parity check circuit 138b detects a transmission error in the received parity encoded digital audio data stream, the second parity check circuit 130b will assert the output line 138b.

The selector circuit 136 is a 2:1 selector circuit having, as a first input, the parity encoded digital audio data stream output the delay circuit 132a and, as a second input, the parity encoded digital audio data stream output the delay circuit 132b. In response to receipt of a control signal received from the logic circuit 134, the selector circuit 136 selects either the parity encoded digital audio data stream output the delay circuit 132a or the parity encoded digital audio data stream output the delay circuit 132b as the output of the broadcast router component. For example, the selector circuit 136 may be configured to pass the parity encoded digital audio data stream output the first delay circuit 132a if the control input 140 is unasserted but will pass the parity encoded digital audio data stream output the second delay circuit 132b if the control input 140 is asserted. The control input 140 is selectively asserted by the logic circuit 134 based upon the particular logic circuitry selected therefore and the state of the inputs 138a, 138b thereto. For example, the logic circuit 134 may be configured to keep the output 140 unasserted whenever the input 138a is unasserted but will assert the output 140 upon an initial assertion of the input 138a is asserted. Once the output 140 is asserted, it will remain asserted until a subsequent assertion of the input 138b, at which point the logic circuit 134 will deassert the output 140.

When the logic circuit 134 is configured in the aforedescribed manner, the selector circuit 136 will normally pass the parity encoded digital audio data stream output the first delay circuit 132a which has been determined, by the first parity check circuit 130a, to be free from transmission errors. Whether free from transmission errors or not, the parity encoded digital audio data stream output the second delay circuit 132b will remain unselected. If the first parity check circuit 130a detects an error in the first parity encoded digital audio data stream, the first parity check circuit 130 will assert the output 138a. In response, the logic circuit 134 will assert the output 140, thereby causing the selector circuit 136 to deselect the first parity encoded digital audio stream and to select the second parity encoded digital audio stream as the output of the broadcast router component 102. By switching to the second, redundant, parity encoded output digital audio stream, the first router matrix card 126a may be repaired or replaced without interrupting the digital audio stream output the broadcast router component 102.

As disclosed herein, once the output of the broadcast router component 102 has been switched to the second parity encoded digital audio stream, the selector circuit 136 will continue to pass the second parity encoded digital audio data stream output the first second delay circuit 132b whether or not the transmission error detected in the first parity encoded digital audio data stream clears. Thus, once the second parity encoded digital audio stream has been selected by the selector circuit 136, the first parity encoded digital audio data stream output the first delay circuit 132a will remain unselected. It however, the second parity check circuit 130b subsequently detects an error in the second parity encoded digital audio data stream, the second parity check circuit 130b will assert the output 138b. In response, the logic circuit 134 will deassert the output 140, thereby causing the selector circuit 136 to deselect the second parity encoded digital audio stream and to reselect the first parity encoded digital audio stream as the output of the broadcast router component 102.

It is contemplated that such a configuration will minimize the number of instances that the source of the parity encoded digital audio stream output the broadcast router component 102a will be switched from a first one of the first and second router matrices 124a and 124b to the other one of the first and second router matrices 124a and 124b. Of course, other configurations of the logic circuitry 134 are also suitable for the uses contemplated herein. For example, the logic circuitry 134 may be configured such that the first parity encoded digital audio data stream from the first delay circuit 132a is normally the output of the broadcast router component 102a. Upon detection of a transmission error by the first parity check circuit 130a, the logic circuit 134 will assert the control input 146, thereby switching the output of the broadcast router component 102a to the second digital audio data stream. In this configuration, however, upon correction of the transmission error and deassertion of the output 138a, the logic circuit 134 will deassert the control input 140, thereby switching the output of the broadcast router component 102a back to the first digital audio data stream. While such a configuration may reduce the complexity of the switching circuitry for the broadcast router component, however, detection of generally simultaneous transmission errors in both digital audio data streams would be less likely.

Finally, it should be noted that, in order for the selector circuit 136 to seamlessly switch between the first digital audio data stream and the second digital audio data stream as the output of the broadcast router component 102, the first and second digital audio data streams should be synchronized with one another. It is contemplated that synchronization of the digital audio data streams may be accomplished using a variety of techniques. For example, the first and second delay circuits 132a and 132b may be tied to a common reference signal (not shown) which controls propagation of the first and second digital audio data streams from the first and second delay circuits 132a and 132b, respectively, to the switching circuit 136.

Continuing to refer to FIG. 2, another aspect of the invention suitable for use along or in conjunction with the parity encoding techniques hereinabove described will now be described in greater detail. As previously set forth, the first router matrix 124a receives N input digital audio data streams from the selection circuitry 123 residing on the input card 121, the first router matrix card of the second router component 104, the first router matrix card of the third router component 106 and the first router matrix card of the fourth router component 108. Within the router matrix 124a, a variety of components result in M output digital audio data streams being generated from the 4N input digital audio data streams. The M output digital audio data streams are then propagated, through various components residing on the first router matrix card 122a, to parity check circuit 130a and the delay circuit 132a of the output card 128. Of these components, only the parity encoder circuit 126a may be seen in FIG. 2. However, it should be readily appreciated that, when physically embodied, the M output digital audio data streams may need to be propagated through other devices as well. Similarly, the second router matrix 124b receives N input digital audio data streams from the selection circuitry 123 residing on the input card 121, the second router matrix card of the second router component 104, the second router matrix card of the third router component 106 and the second router matrix card of the fourth router component 108. Within the second router matrix 124b, M output digital audio data streams are produced from the 4N input digital audio data streams. The M output digital audio data streams are then propagated, through various components residing on the second router matrix card 122b, to second parity check circuit 130b and the delay circuit 132b of the output card 128. Again, it should be readily appreciated that various components within the router matrix 124b or otherwise located along the path of the M output digital audio data streams being propagated to the output card 128 are not shown in FIG. 2.

In accordance with this aspect, it is contemplated that, as the digital audio data streams are propagated towards the output card 128, one or more of the various components handling the streams may modify the streams based upon a determination, by that component, of the presence of an error or other type of fault condition. For example, each data stream may include one or more "health" bytes. Each bit of the one or more health bytes is assigned to one of the components through which the data stream will pass and is initially set to zero. As the data stream passes through that component, the component will set the health bit or bits assigned thereto if the component detects the presence of an error of other fault condition. For example, the router matrix 124*a* receives input data streams from four sources—the selection circuit 123, the first router matrix card of the second router component 104, the first router matrix card of the third router component 106 and the first router matrix card of the fourth router component 108. A bit of a first health byte may be assigned to each one of these data sources and, if the connection with that data source fails, the router matrix 124*a* will set the corresponding bit. Further by way of example, each data stream may include one or more "status" bytes. Similar to health bytes, each bit of the one or more status bytes is initially set to zero but will be set if certain conditions are detected, for example, "board not present" or "board not in ready state", as the data stream passes through the first broadcast router component 102. In this manner, as the first and second set of M output digital audio data streams propagate towards the selection circuit 136, various bits of the health byte or bytes and/or the status byte or bytes of the M output digital audio data streams will be set. When the first and second parity check circuits 130*a* and 130*b* receive the first and second sets of M parity encoded output digital audio data streams from the first and second parity encoder circuits 126*a* and 126*b*, respectively, the parity check circuit 130*a*, 130*b* will also examine the health byte or bytes received thereby. While a variety of techniques may be used to examine the health byte or bytes, one suitable technique would be to count the number of bits which have been set. By doing so, each one of the first and second parity check circuits 130*a* and 130*b* will generate either a "health count", a "status count" or both. The health count consists of a total number of errors or other types of faults detected during propagation of the respective data streams. As each detected error increments the health count, a lower health count is representative of less errors. Similarly, the status count consists of a total number of "not presents" and/or "not readies" detected during propagation of the respective data streams. As each detected "not present" or "not ready" increments the status count, a lower status count is representative of a higher degree of readiness.

The health and/or status count determined by each one of the first and second parity check circuits 132*a* and 132*b* is forwarded to the logic circuit 134 where they may be used alone, or in conjunction with parity error detection, to select one of the two sets of M digital audio data streams to be output the broadcast router 100. For example, the logic circuit 134 may be configured to select the digital audio data stream having the lowest health count without any consideration of the presence of a parity error. Alternately, the logic circuit 134 may be configured to select the digital audio data stream determined to lack a parity error but, in the event that both digital audio data streams either lack a parity error or have a parity error, the digital audio data stream will select the digital audio data stream having the lowest health count. Thus, in this configuration, the health byte provides a manner to resolve those situations where the first and second parity check circuits 130*a* and 130*b* produce the same result.

Thus, there has been disclosed and illustrated herein a fault-tolerant broadcast router configured to switch between a pair of output data streams based upon a comparative analysis of the data streams. Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A fault-tolerant router, comprising:
   a first router matrix card, said first router matrix card receiving N parity encoded input digital audio data streams and generating, from said N parity encoded input digital audio data streams, a first set of M parity encoded output digital audio streams, wherein M and N are integers and M is different from N;
   a second router matrix card, said second router matrix card receiving said N parity encoded input digital audio data streams and generating, from said N parity encoded input digital audio data streams, a second set of M parity encoded digital audio streams;
   an output card coupled to said first router matrix card and said second router matrix card, said output card receiving said first set of M parity encoded output digital audio streams from said first router matrix card and said second set of said M parity encoded output digital audio streams from said second router matrix card, providing, as an output therefrom, a selected one of said first and second sets of M parity encoded output digital audio streams, and switching from said selected one of said first and second sets of M parity encoded output digital audio data streams to an unselected one of said first and second sets of M parity encoded output digital audio data streams based upon detecting a parity error in said selected one of said first and second sets of M parity encoded output digital audio data streams regardless of whether a parity error is present in said unselected one of said first and second sets of M parity encoded output digital audio data streams.

2. The apparatus of claim 1, wherein said output card further comprises a switching circuit coupled to receive said first set of M parity encoded output digital audio data streams from said first router matrix card and said second set of M parity encoded output digital audio data streams from said second router matrix card, said switching circuit switching from said selected one of said first and second sets of M parity encoded output digital audio data streams to said unselected one of said first and second sets of M parity encoded output digital audio data streams in response to assertion of a switching signal.

3. The apparatus of claim 2, wherein said output card further comprises:
   a first parity check circuit coupled to receive said first set of M parity encoded output digital audio data streams from said first router matrix card;
   a second parity check circuit coupled to receive said second set of M parity encoded output digital audio data streams from said second router matrix card; and
   a logic circuit coupled to receive a first parity error signal from said first parity check circuit and a second parity check error signal from said second parity check circuit, said logic circuit determining, based upon said first parity error signal received from said first parity check circuit and said second parity error signal received from said second parity check circuit, whether to assert said switching signal.

4. The apparatus of claim 3, wherein said output card further comprises
a first delay circuit coupled to receive said first set of M parity encoded output digital audio data streams from said first router matrix card; and
a second delay circuit coupled to receive said second set of M parity encoded output digital audio data streams from said second router matrix card;
said switching circuit coupled to receive said first set of M parity encoded output digital audio data streams from said first router matrix card and said second set of M parity encoded output digital audio data streams from said second router matrix card via said first delay circuit and said second delay circuit, respectively.

5. The apparatus of claim 3, wherein said logic circuit asserts said switching signal based upon detection of said parity error in said selected one of said first and second sets of M parity encoded output digital audio data streams.

6. The apparatus of claim 3, wherein said switching circuit switches back from said unselected one of said first and second sets of M parity encoded output digital audio data streams to said selected one of said first and second sets of M parity encoded output digital audio data streams based upon assertion of said switching signal.

7. The apparatus of claim 6, wherein said logic circuit asserts said switching signal based upon detection of a parity error in said unselected one of said first and second sets of M parity encoded output digital audio data streams.

8. The apparatus of claim 6, wherein said logic circuit asserts said switching signal based upon detection of a parity error in said unselected one of said first and second sets of M parity encoded output digital audio data streams only if no parity error is present in said selected one of said first and second sets of M parity encoded output digital audio streams.

9. The apparatus of claim 6, wherein said logic circuit asserts said switching signal based upon detection of a parity error in said unselected one of said first and second sets of M parity encoded output digital audio data streams regardless of whether a parity error is present in said selected one of said first and second sets of M parity encoded output digital audio data streams.

10. The apparatus of claim 1, wherein said output card is further configured to continue providing as the output therefrom the unselected one of said first and second sets of M parity encoded output digital audio streams, even if no further parity error is detected in said selected one of said first and second sets, unless a parity error is detected in said unselected one of said first and second sets.

11. A fault-tolerant router, comprising:
a first router matrix card, said first router matrix card receiving N parity encoded input digital data streams and generating, from said N parity encoded input digital data streams, a first set of M parity encoded output digital streams, wherein M and N are integers and M is different from N;
a second router matrix card, said second router matrix card receiving said N parity encoded input digital data streams and generating, from said N parity encoded input digital data streams, a second set of M parity encoded digital streams;
an output card coupled to said first router matrix card and said second router matrix card, said output card receiving said first set of M parity encoded output digital streams from said first router matrix card and second set of said M parity encoded output digital streams from said second router matrix card, providing, as an output therefrom, a selected one of said first and second sets of M parity encoded output digital streams, and switching from said selected one of said first and second sets of M parity encoded output digital data streams to an unselected one of said first and second sets of M parity encoded output digital data streams based upon detecting a parity error in said selected one of said first and second sets of M parity encoded output digital data streams regardless of whether a parity error is present in said unselected one of said first and second sets of M parity encoded output digital audio data streams.

12. A fault-tolerant router, comprising:
a first router matrix card, said first router matrix card receiving N parity encoded input digital audio data streams and generating, from said N parity encoded input digital audio data streams, a first set of M parity encoded output digital audio streams;
a second router matrix card, said second router matrix card receiving said N parity encoded input digital audio data streams and generating, from said N parity encoded input digital audio data streams, a second set of M parity encoded digital audio streams; and
an output card coupled to said first router matrix card and said second router matrix card, said output card receiving said first set of M parity encoded output digital audio streams from said first router matrix card and said second set of said M parity encoded output digital audio streams from said second router matrix card, providing, as an output therefrom, a selected one of said first and second sets of M parity encoded output digital audio streams, and switching from said selected one of said first and second sets of M parity encoded output digital audio data streams to an unselected one of said first and second sets of M parity encoded output digital audio data streams based upon detecting a parity error in said selected one of said first and second sets of M parity encoded output digital audio data streams,
wherein said output card further comprises:
a switching circuit coupled to receive said first set of M parity encoded output digital audio data streams from said first router matrix card and said second set of M parity encoded output digital audio data streams from said second router matrix card, said switching circuit switching from said selected one of said first and second sets of M parity encoded output digital audio data streams to said unselected one of said first and second sets of M parity encoded output digital audio data streams in response to assertion of a switching signal;
a first parity check circuit coupled to receive said first set of M parity encoded output digital audio data streams from said first router matrix card;
a second parity check circuit coupled to receive said second set of M parity encoded output digital audio data streams from said second router matrix card; and
a logic circuit coupled to receive a first parity error signal from said first parity check circuit and a second parity check error signal from said second parity check circuit, said logic circuit determining, based upon said first parity error signal received from said first parity check circuit and said second parity error signal received from said second parity check circuit, whether to assert said switching signal, and
wherein said logic circuit asserts said switching signal based upon detection of said parity error in said selected one of said first and second sets of M parity encoded output digital audio data streams regardless of whether a parity error is present in said unselected one of said first and second sets of M parity encoded output digital audio data streams.

13. A fault-tolerant router, comprising:
a first router matrix card, said first router matrix card receiving N parity encoded input digital audio data streams and generating, from said N parity encoded input digital audio data streams, a first set of M parity encoded output digital audio streams;
a second router matrix card, said second router matrix card receiving said N parity encoded input digital audio data streams and generating, from said N parity encoded input digital audio data streams, a second set of M parity encoded digital audio streams; and
an output card coupled to said first router matrix card and said second router matrix card, said output card receiving said first set of M parity encoded output digital audio streams from said first router matrix card and said second set of said M parity encoded output digital audio streams from said second router matrix card, providing, as an output therefrom, a selected one of said first and second sets of M parity encoded output digital audio streams, and switching from said selected one of said first and second sets of M parity encoded output digital audio data streams to an unselected one of said first and second sets of M parity encoded output digital audio data streams based upon detecting a parity error in said selected one of said first and second sets of M parity encoded output digital audio data streams,
wherein said output card further comprises:
a switching circuit coupled to receive said first set of M parity encoded output digital audio data streams from said first router matrix card and said second set of M parity encoded output digital audio data streams from said second router matrix card, said switching circuit switching from said selected one of said first and second sets of M parity encoded output digital audio data streams to said unselected one of said first and second sets of M parity encoded output digital audio data streams in response to assertion of a switching signal;
a first parity check circuit coupled to receive said first set of M parity encoded output digital audio data streams from said first router matrix card;
a second parity check circuit coupled to receive said second set of M parity encoded output digital audio data streams from said second router matrix card; and
a logic circuit coupled to receive a first parity error signal from said first parity check circuit and a second parity check error signal from said second parity check circuit, said logic circuit determining, based upon said first parity error signal received from said first parity check circuit and said second parity error signal received from said second parity check circuit, whether to assert said switching signal, and
wherein:
said switching circuit switches back from said unselected one of said first and second sets of M parity encoded output digital audio data streams to said selected one of said first and second sets of M parity encoded output digital audio data streams based upon assertion of said switching signal, and
said logic circuit asserts said switching signal based upon detection of a parity error in said unselected one of said first and second sets of M parity encoded output digital audio data streams regardless of whether a parity error is present in said selected one of said first and second sets of M parity encoded output digital audio data streams.

* * * * *